US009902232B2

(12) United States Patent
Schaller et al.

(10) Patent No.: US 9,902,232 B2
(45) Date of Patent: Feb. 27, 2018

(54) AXIAL-FLOW BLOWER ARRANGEMENT

(71) Applicant: Spheros GmbH, Gilching (DE)

(72) Inventors: Ralph Schaller, Landsberg am Lech (DE); Helmut Scheid, Denklingen (DE); Klaus Ellinger, Gauting (DE); Uwe Berger, Unterhaching (DE)

(73) Assignee: Spheros GmbH, Gilching (DE)

( * ) Notice: Subject to any disclaimer, the term of this patent is extended or adjusted under 35 U.S.C. 154(b) by 148 days.

(21) Appl. No.: 14/810,047

(22) Filed: Jul. 27, 2015

(65) Prior Publication Data

US 2015/0328952 A1 Nov. 19, 2015

Related U.S. Application Data

(63) Continuation of application No. 13/505,980, filed as application No. PCT/EP2010/007046 on Nov. 19, 2010, now abandoned.

(30) Foreign Application Priority Data

Nov. 24, 2009 (DE) .................. 10 2009 054 343
Dec. 18, 2009 (DE) .................. 10 2009 058 855

(51) Int. Cl.
*B60H 1/32* (2006.01)
*B60H 1/00* (2006.01)
(52) U.S. Cl.
CPC ..... *B60H 1/00371* (2013.01); *B60H 1/00542* (2013.01); *B60H 1/3227* (2013.01); *B60H 2001/00235* (2013.01)
(58) Field of Classification Search
CPC ............ B60H 1/00235; B60H 1/00371; B60H 1/00542

(Continued)

(56) References Cited

U.S. PATENT DOCUMENTS 4,926,655 A 5/1990 King
5,632,330 A 5/1997 Drucker et al.
(Continued)

FOREIGN PATENT DOCUMENTS

DE           10225812 C1    8/2003
DE    20 2008 002 054 U1    5/2008
(Continued)

OTHER PUBLICATIONS

Translation of Korean Patent Document KR 20070087997 A entitled Translation—KR 20070087997 A.*
(Continued)

*Primary Examiner* — Len Tran
*Assistant Examiner* — Paul Alvare
(74) *Attorney, Agent, or Firm* — Sughrue Mion, PLLC

(57) ABSTRACT

An axial-flow blower arrangement for the condenser (28) of a roof-mounted air conditioning installation including two evaporator units (3, 4) and a condenser unit (2) arranged between them comprises at least two blower modules (1), each of which has a box-shaped downwardly open hood (10) which has a cover wall (12) and walls (14, 15, 16, 17) which in the mounted condition extend downwardly from the cover wall and which together with the cover wall enclose an air suction chamber (26), out of which an axial-flow blower (23) mounted under the cover wall sucks air and discharges it into the atmosphere through an air outlet opening (20). The walls of the air suction chamber of each blower module extend in the mounted condition so far downwardly to the horizontally lying condenser (28) which completely covers over the open underside of the hood (10) and so terminate with the condenser that under the action of the axial-flow blower only air which has previously passed through the condenser can pass into the air suction chamber of the blower module.

8 Claims, 4 Drawing Sheets

(58) Field of Classification Search
USPC .......................................... 62/244, 239, 200
See application file for complete search history.

(56) References Cited

U.S. PATENT DOCUMENTS

| | | | |
|---|---|---|---|
| 6,282,912 B1 | 9/2001 | Mannerheim | |
| 6,295,826 B1 | 10/2001 | Lee | |
| 6,579,063 B2 | 6/2003 | Stairs et al. | |
| 6,763,670 B1 | 7/2004 | Bushnell et al. | |
| 2005/0268645 A1* | 12/2005 | Kent | F25B 39/04 |
| | | | 62/509 |
| 2006/0037339 A1* | 2/2006 | Hassel | B60H 1/00371 |
| | | | 62/244 |
| 2010/0024458 A1 | 2/2010 | Schmitt et al. | |

FOREIGN PATENT DOCUMENTS

| | | |
|---|---|---|
| EP | 1 340 634 A1 | 9/2003 |
| EP | 2017102 A2 | 1/2009 |
| KR | 10-2007-0087997 A | 8/2007 |
| KR | 20070087997 A * | 8/2007 |
| WO | 2008/061519 A1 | 5/2008 |
| WO | WO 2008061519 A1 * | 5/2008 ......... B60H 1/00371 |

OTHER PUBLICATIONS

Translation of International Patent Document WO 2008061519 A1 entitled Translation—WO 2008061519 A1.*
Communication dated Aug. 26, 2014 from the State Intellectual Property Office of the People's Republic of China in counterpart application No. 201080047791.3.
Communication dated Dec. 27, 2013 from the State Intellectual Property Office of the People's Republic of China in counterpart application No. 201080047791.3.
Communication dated May 28, 2014 from the German Patent and Trademark Office in counterpart application No. 102009058855.8.
Communication dated Oct. 20, 2010 from the German Patent and Trademark Office in counterpart application No. 102009058855.8.
Document DE202008002054U1—translation added as a translation of Foreign Document DE202008002054U1.
Document EP2017102A2 added for reference.
Document EP2017102A2—translation added as a translation for document EP2017102.

* cited by examiner

AXIAL-FLOW BLOWER ARRANGEMENT

CROSS-REFERENCE TO RELATED APPLICATION

This application is a Continuation application of U.S. application Ser. No. 13/505,980 filed May 3, 2012, which is a National Stage of International Application No. PCT/EP2010/007046 filed Nov. 19, 2010, claiming priority based on Germany Patent Application Nos. 10 2009 054 343.0 filed Nov. 24, 2009 and 10 2009 058 855.8 filed Dec. 18, 2009, the contents of all of which are incorporated herein by reference in their entirety.

BACKGROUND

The invention concerns an axial-flow blower arrangement for the condenser of an air conditioning installation to be mounted on a vehicle roof.

It is known from the state of the art, for air conditioning vehicles, in particular buses, to use roof-mounted air conditioning installations in which all components required for air conditioning are integrated.

In that respect a particular structure represents so-called one-part compact installations in which all components are mounted in a carrier or tray structure with further housing portions and casings on the vehicle roof. In general, viewed in the direction of travel, arranged to the right and the left of the center of the vehicle are evaporator trays which together with the components accommodated therein are referred to as evaporator units. With that type of installation, positioned between the evaporator units is a condenser unit which includes the condenser and the blowers required for passing air therethrough, generally axial-flow blowers. The condenser unit also connects the two evaporator units together in terms of strength-related aspects so that the three units together with the covers and casing portions afford a compact installation.

With this special construction at least one elongate, horizontally disposed condenser is used, over which is arranged an axial-flow blower air box, the areal dimension of which is at least as large as the area of the condenser. Generally a plurality of axial-flow blowers are arranged in succession in the direction of travel in those axial-flow blower air boxes in such a way that their rotary shafts extend in a vertical direction. Fitted beneath the condenser are connecting struts which connect the two evaporator units together and at the same time support the condenser. The axial-flow blower air box is also mounted to those connecting struts.

Provided between the condenser or the axial-flow blower air box and the evaporator units arranged to the left and right thereof are air flow passages which at their top side have air intake openings covered by grills. At their open underside those air flow passages open into an air collecting chamber which remains between the condenser and the vehicle roof and out of which air is sucked through the condenser by the action of the axial-flow blowers and is discharged upwardly to the external space through air outlet openings covered with grills. Air is also sucked in under the ends of the condenser, that is to say at the front and rear in the direction of travel, and flows in from various openings in the casing portions. Air is therefore supplied to the condenser over its entire periphery. Together with the spacing relative to the bus roof, that affords the suction intake area, the size of which is a substantial measurement in respect of the amount of air which can be supplied.

A disadvantage with that known arrangement is that relatively many components are required to connect the evaporator units and for mounting the condenser unit. A plurality of carrier elements which are arranged in succession in the direction of travel are required, which connect the evaporator units together and support the condenser unit. The at least one condenser of a height of more than 50 mm, the axial-flow blower air box, the axial-flow blowers themselves and the air flow passages between the axial-flow blower air box and the evaporator trays are mounted by way of those carrier elements. The weight and the costs of those components are high and they require a mounting procedure which is time-intensive. The axial-flow blower air box is relatively large and cannot be produced with favorable, off-tool processes.

That is used to denote those processes in which the component in question can be removed from a molding or shaping tool in the condition of being ready for use without subsequent further processing and the fitment of further additional parts.

Satisfactory uniform supply of air to the condenser from below upwardly depends greatly on the free flow cross-section under the condenser and the spacing of the axial-flow blower blades from the condenser. As the structural height of roof-mounted air conditioning installations is to be as low as possible because of the overall height of the vehicle and for design and weight reasons, there is generally only a comparatively small free cross-section for the intake flow of air into the condenser and the blowers whereby the amount of heat which can be transmitted is reduced.

The connecting struts extending under the condenser transversely relative to the direction of travel additionally impede the free flow of air. The axial-flow blowers which are mounted at small spacings above the upper surface of the condenser substantially only suck air out of the circular area directly beneath them. As the condenser is generally of a width greater than the diameter of the blowers it does not have air flowing uniformly therethrough both transversely relative to the direction of travel and also in the longitudinal direction. In addition upon failure of an axial-flow blower a large part of the air flow is short-circuited from the next blower and therefore does not flow through the condenser. In such a case the performance of the condenser is reduced more greatly than corresponds to the area of the failed blower.

SUMMARY OF THE INVENTION

Accordingly the object of the invention is to develop an axial-flow blower arrangement of the kind set forth in the opening part of this specification, such that with the smallest possible structural height it permits a uniform flow of air through the condenser, it is of low weight, and it can be mounted easily and substantially without using additional parts between the evaporator units.

According to the invention the hitherto usual axial-flow blower air box, from the interior of which all axial-flow blowers used jointly suck air, is replaced by two or more blower modules which are arranged in succession in the direction of travel but each of which has its own housing in the form of a box-shaped, downwardly open hood. The walls projecting downwardly from the cover wall of the hood in the assembled condition directly adjoin the horizontally disposed condenser in such a way that practically all the air which the axial-flow blower of each individual blower module sucks in must necessarily flow through the condenser. There are therefore no secondary flow paths worth mentioning, through which air could be sucked in, which has not passed through the condenser and has therefore not absorbed heat therefrom.

The two or more blower modules, the hoods of which are preferably of a rectangular configuration in plan, are mounted in directly mutually adjoining relationship between the evaporator units in the longitudinal direction of the vehicle in such a way that the front and rear walls of the hoods of mutually adjacent blower modules bear directly against each other.

As it is no longer solely the circular diameter of the axial-flow blowers but substantially the lower rectangular opening of the hood that defines the surface area region of the condenser, through which air is sucked, the blower modules according to the invention permit substantially better adaptation to the elongate area of the condenser so that this affords a larger condenser area that effectively has air flowing therethrough and thus this gives a considerable improvement in performance. In that way it is possible to use fewer axial blowers for a predetermined condenser length, than is required in the state of the art.

Preferably the walls of the hoods of the blower modules at their lower ends have holders for stably receiving and fixing the condenser.

Preferably the blower modules include air flow passages arranged laterally outside their side walls and having upwardly disposed air intake openings generally covered by grills. The air flow passages are open downwardly and open into an air collecting chamber which is formed between the vehicle roof, the evaporator units and the underside of the condenser and from which the air sucked in by the axial-flow blowers flows upwardly through the condenser.

The blower modules thus represent multi-function units as arranged in each thereof is a respective axial-flow blower, each of them defines a precise surface area region of the condenser out of which air is substantially uniformly sucked in, each of them has lateral air flow passages and they jointly carry the condenser. They thus form the sole connecting elements between the evaporator units. Grills covering the air intake openings can be produced integrally with the hood. As a plurality of identical blower modules are used for each respective roof-mounted air conditioning installation, off-tool production which is optimized in terms of cost and weight is possible.

Preferably an extremely thin flat-tube condenser (aluminum multi-port condenser) arranged in a lying condition is used, which affords a greater free air intake suction cross-section in comparison with the hitherto usual round-tube condensers. It includes a plurality of flat tubes in which the refrigerant liquefies (condenses) and which are hydraulically coupled to the condenser ends by fixedly soldered or brazed connecting tubes. The refrigerant is fed by way of a tube connection and a refrigerant conduit to a refrigerant collector, from which it is fed by way of a condenser connecting tube to at least two flat tubes of the condenser in which it is supercooled to increase the useable enthalpy of the refrigerant.

These and further advantageous configurations of an axial-flow blower arrangement according to the invention are set forth in the appendant claims.

BRIEF DESCRIPTION OF THE DRAWINGS

The invention is described hereinafter by means of an embodiment by way of example with reference to the drawing in which.

DETAILED DESCRIPTION OF THE INVENTION

In all the Figures the same parts are denoted by the same references.

Figure 1:
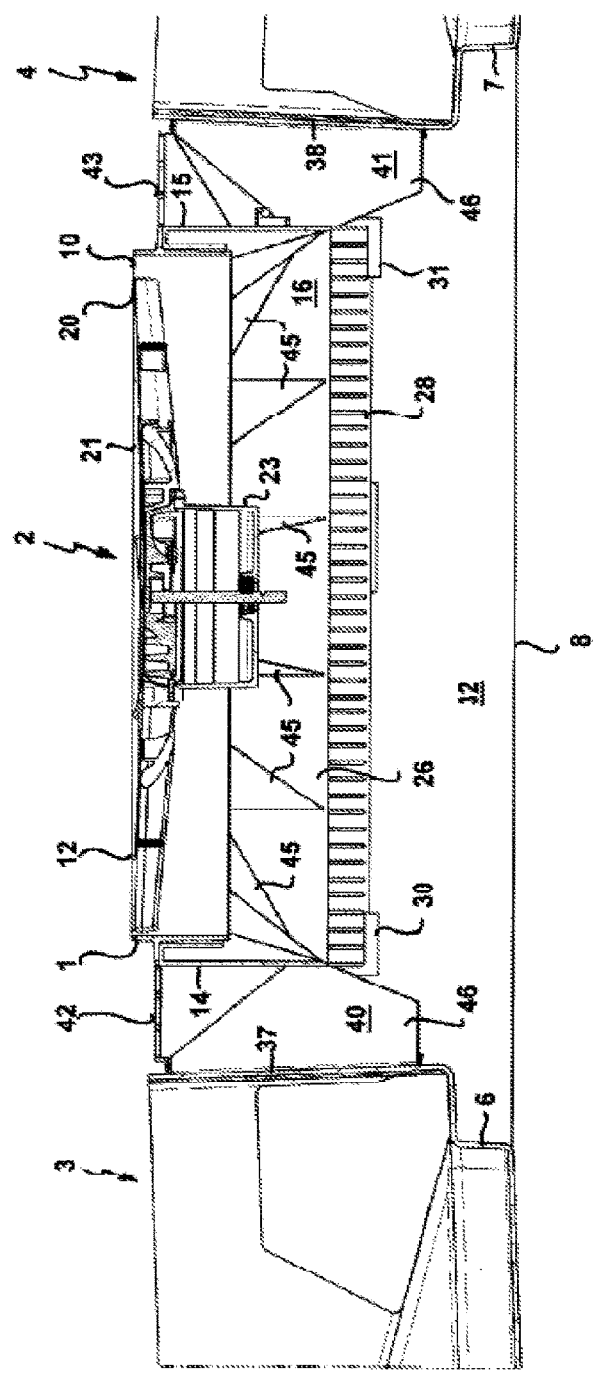
FIG. 1 shows a diagrammatic section through the central part of a roof-mounted air conditioning installation equipped with an axial-flow blower arrangement according to the invention.

FIG. 1 shows a vertical section through a blower module 1 according to the invention which is mounted as part of a condenser unit 2 in self-supporting relationship between the two evaporator units 3 and 4 of which only part is shown and which are arranged to the right and the left of the center line of the vehicle extending perpendicularly to the plane of the drawing, which evaporator units 3, 4 rest with their base regions 6, 7 on the vehicle roof 8 and are fastened there in known manner. The blower module 1 has a box-shaped hood 10 which is open at the underside and which is of a rectangular configuration in plan and which includes a cover wall 12 and four walls extending at a right angle downwardly from the cover wall 12. They involve two side walls 14, 15 and a front wall 16 and a rear wall 17 which is not visible in the sectional view in FIG. 1 and which is closer to the viewer (see FIGS. 2 through 4).

Provided in the cover wall 12 is an air outlet opening 20 into which an axial-flow blower 23 with a vertical axis of rotation is inserted from above. The blower 23 rests with a mounting flange on the top side of the cover wall and is fastened there. The blower 23 sucks air out of an air suction chamber 26 enclosed by the cover wall 12 and the four walls 14 through 17 of the hood 10 and blows it upwardly through a cover grill 21 into the atmosphere.

The lower ends of the vertical walls 14 through 17 surround a substantially rectangular opening which is completely covered by a horizontally lying, very flat condenser 28 which is carried by holders 30, 31 disposed at the lower ends of the side walls 14, 15. The condenser 28 bear in almost air-tight relationship against the lower ends of the walls 14 through 17 so that practically all the air sucked away from the air suction chamber 26 by the blower 23 must flow through the condenser 28.

Disposed beneath the condenser 28 is an air collecting chamber 32 which is delimited laterally by the base regions 6, 7 of the evaporator units 3, 4 and downwardly by the vehicle roof 8.

The cover wall 12 of the hood 10 has on both sides approximately horizontally extending shoulders 34, 35 which project towards the evaporator units 3, 4 and which are fastened to the outside walls 37, 38 of the evaporator units 3, 4 for self-supporting mounting of the blower module 1. The outside walls 37, 38, with the side walls 14 and 15 respectively arranged beside them towards the center, enclose air flow passages 40, 41 which are open downwardly to the bus roof 8. Provided in the shoulders 34, 35 of the cover wall 12 are air intake openings covered by grills 42, 43. As an alternative thereto downwardly angled walls can also extend to the outside edges of the shoulders 34, 35, which walls in the mounted condition are in direct contact with and are fixedly connected to the outside walls, towards the condenser unit 2, of the evaporator units 3, 4.

Thus outside air can pass on a flow path identified by arrows S through the air intake openings into the air flow passages 40 and 41 and from them into the air collecting chamber 32, from which it flows through the condenser 28 by virtue of the suction action of the blower 23, and leaves the hood 10 through the air outlet opening 20.

It is possible in known manner for air also to be sucked into the air collecting chamber 32 out of the vehicle interior by way of openings (not shown) and controllable flaps closing same, and to be discharged outwardly by way of the axial-flow blower 23.

Figure 2:
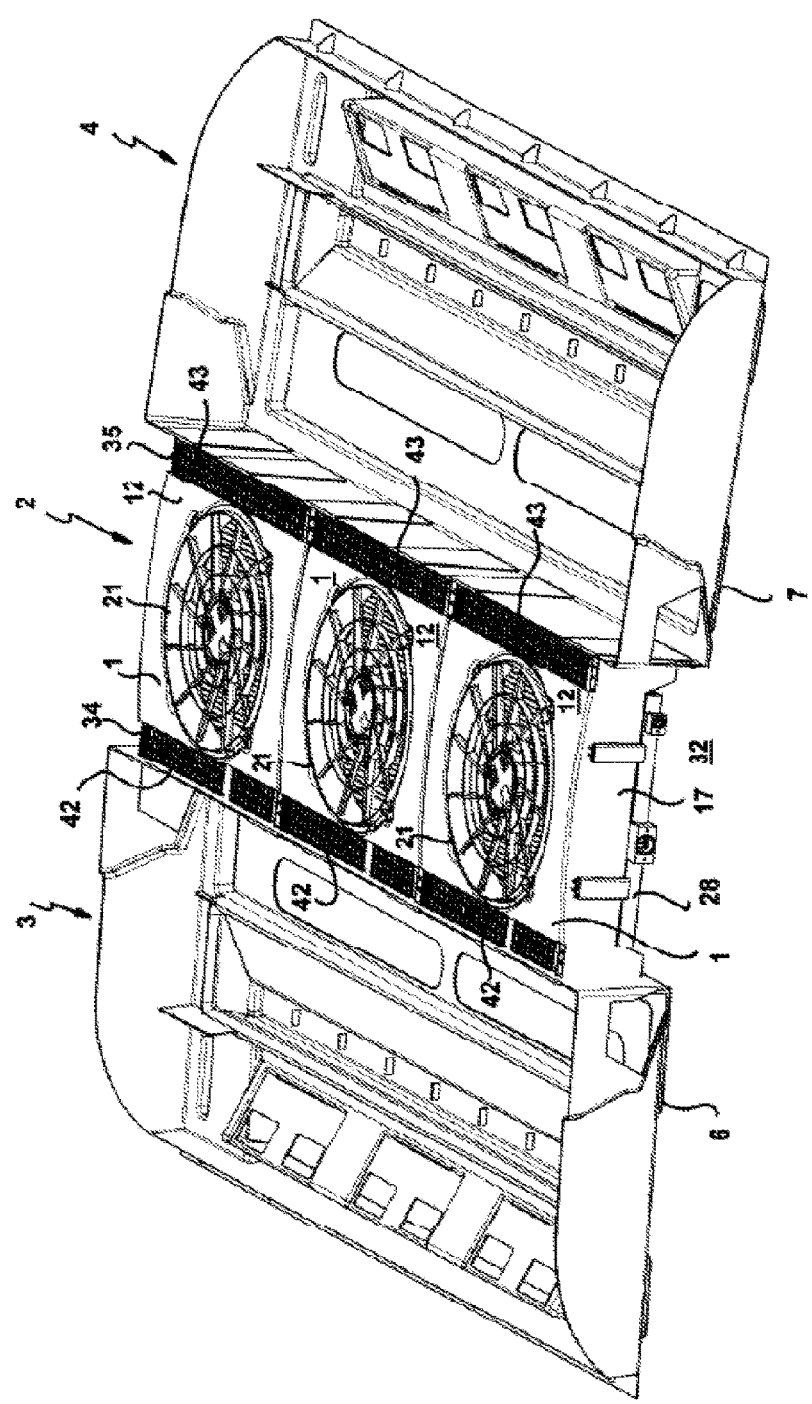
FIG. 2 shows a perspective view of the air conditioning installation of FIG. 1, wherein of the evaporator units only the empty trays are shown.
Figure 3:
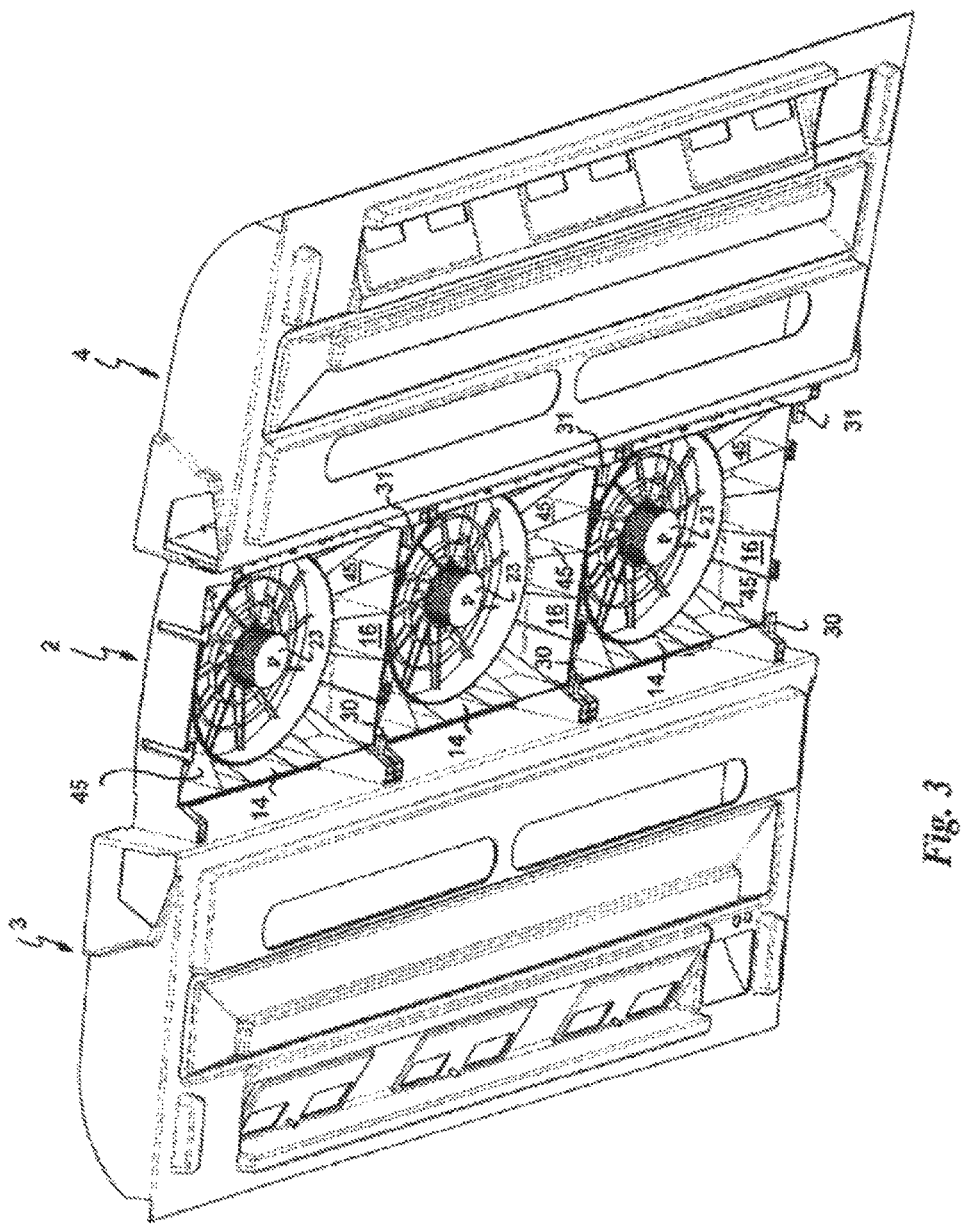
FIG. 3 shows a perspective view from below of the air conditioning installation of FIG. 1 with condenser omitted.
Figure 4:
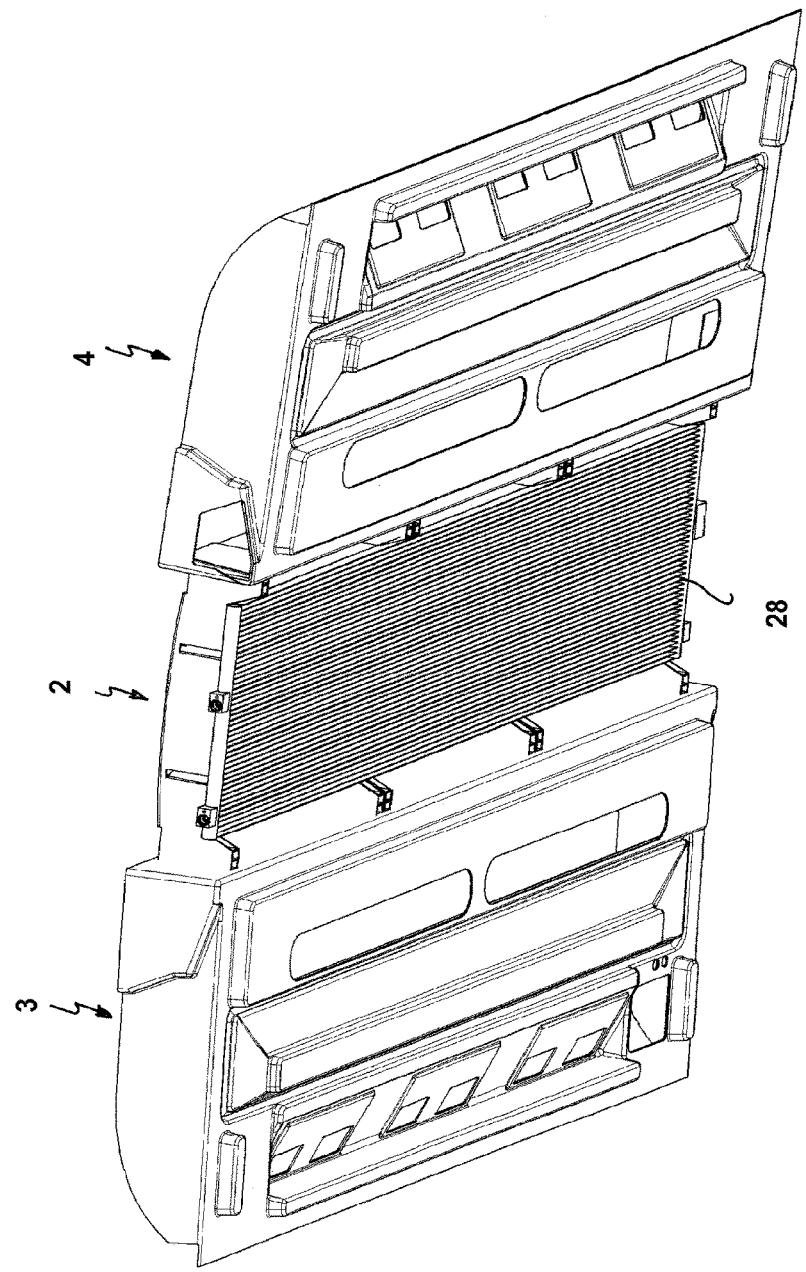
FIG. 4 shows a perspective view corresponding to FIG. 3 from below with installed condenser.

The embodiment of an axial-flow blower arrangement according to the invention as shown in FIGS. 2 and 3 includes three blower modules 1 so arranged in succession in the longitudinal direction of the vehicle that the vertical front and rear walls respectively of mutually adjacent modules are in direct contact with each other. They thus cover over the entire area of the condenser 28 which in the mounted condition is carried by the holders 30, 31 of the blower modules 1, that are clearly visible in FIG. 3.

It will further be seen that the hoods 10 of the blower modules 1 are stiffened by a plurality of stiffening ribs 45 which impart such strength to the hoods 10 that they can readily carry the condenser 28.

It can be seen from FIG. 1 that provided also in the air flow passages 40, 41 are connecting carrier elements 46 which extend from the side walls 14, 15 and impart high strength to the blower modules 1. What is essential in the overall arrangement is that, in spite of the low overall structural height of the roof-mounted air conditioning installation, between the underside of the condenser 28 and the bus roof 8 there is a sufficiently large air collecting chamber 32 which is not constricted in its cross-section by any support members.

In addition the air-tight mounting of the condenser 28 between the downwardly projecting side walls 14, 15 of each module 1 ensures that the air sucked in by the respective axial-flow blower 23 can pass from the air collecting chamber 32 into the air suction chamber 26 exclusively on flow paths which pass through the condenser 28.

It is also guaranteed that each of the modules can suck in air only from the lower opening of its own hood 10. That ensures that, for example when one of the axial-flow blowers 23 fails, the adjacent axial-flow blowers do not suck air on a short-circuit path through the air outlet opening 20 of the failed axial-flow blower 23 and discharge it again to the atmosphere without that air having passed through the condenser 28.

The invention claimed is:

1. Air conditioning installation to be mounted on a vehicle roof and comprising:
   a condenser unit;
   two evaporator units which when mounted are arranged on a left side and a right side of the condenser unit in a direction of travel of the vehicle; and
   a horizontally lying condenser forming an upper boundary of an air collecting chamber that has a lower boundary formed by a top side of the vehicle roof,
   wherein the condenser unit comprises at least two blower modules which are arranged one after another in the direction of travel of the vehicle, and each of which comprises a box-shaped hood having:
   a cover wall, which, when the blower module is mounted horizontally between the two evaporator units, extends at the top side of the hood and is provided with one air outlet at the top side of the hood and is provided with one air outlet opening and side walls which, when the blower module is mounted extend downward from said cover wall into immediate proximity of the condenser and, together with said cover wall, enclose an air suction chamber, having opposite to said cover wall an open bottom side being covered by the horizontally lying condenser,
   each of said blower modules comprising one axial-flow blower being mounted at an underside of said cover wall, and
   wherein each of said axial-flow blowers is associated with one air suction chamber which is separated from all air suction chambers of all other axial-flow blowers.

2. The air conditioning installation as set forth in claim 1, wherein each hood has a rectangular cover wall, a front wall and a rear wall.

3. The air conditioning installation as set forth in claim 2, wherein the cover wall of the hood of each blower module has shoulders which project beyond the two side walls of the hood, each of said shoulders when mounted, being in contact with an outside walls of one of the two evaporator units and enclosing with said outside wall and an outside of the respective side wall of hood an air flow passage leading from an air intake opening in a respective one of said shoulders to a downwardly disposed air outlet which opens into the air collecting chamber beneath the horizontally lying condenser.

4. The air conditioning installation as set forth in claim 3, wherein each of the air intake openings is covered by a grill integrated into the cover wall of the hood.

5. The air conditioning installation as set forth in claim 1, wherein the hood of each of the at least two blower modules comprises a plurality of stiffening elements which are provided integrally in the hood and connect the cover wall of the hood to the side walls.

6. The air conditioning installation as set forth in claim 1, wherein the hood of each of the at least two blower modules comprises a plurality of connecting carrier elements provided integrally in the air flow passage.

7. The air conditioning installation as set forth in claim 1, wherein, when mounted, the outside walls of the respective hood of the at least two blower modules are connected to the two evaporator units for self-supportingly holding the axial-flow blower arrangement so that the air collecting chamber under the condenser is free from structural elements.

8. Air conditioning installation as set forth in claim 1, wherein the condenser is an aluminum multi-port condenser.

* * * * *